United States Patent
Schmitz

[19]

[11] Patent Number: 6,145,558
[45] Date of Patent: Nov. 14, 2000

[54] SEAL ARRANGEMENT FOR A CENTRAL TIRE INFLATION SYSTEM

[75] Inventor: Geoffrey W. Schmitz, Wausau, Wis.

[73] Assignee: Case Corporation, Del.

[21] Appl. No.: 09/208,789

[22] Filed: Dec. 10, 1998

[51] Int. Cl.[7] .................................................. B60C 23/10
[52] U.S. Cl. ........................................... 152/416; 277/563
[58] Field of Search ........................... 152/415, 416–417, 152/418; 277/563, 565, 562, 531

[56] References Cited

U.S. PATENT DOCUMENTS

| | | |
|---|---|---|
| 2,149,797 | 3/1939 | Starke . |
| 2,577,458 | 12/1951 | Gaiptman . |
| 2,634,782 | 4/1953 | Turek et al. . |
| 2,693,841 | 11/1954 | Webster, Jr. . |
| 2,976,906 | 3/1961 | Kamm et al. . |
| 3,099,309 | 7/1963 | Horta et al. . |
| 3,362,452 | 1/1968 | Harnish . |
| 3,705,614 | 12/1972 | Juttner et al. . |
| 3,801,111 | 4/1974 | Messenger ............................... 277/565 |
| 4,387,931 | 6/1983 | Bland . |
| 4,418,737 | 12/1983 | Goodell et al. . |
| 4,431,043 | 2/1984 | Goodell et al. . |
| 4,434,833 | 3/1984 | Swanson et al. . |
| 4,470,506 | 9/1984 | Goodell et al. . |
| 4,492,019 | 1/1985 | Wells et al. . |
| 4,582,107 | 4/1986 | Scully . |
| 4,641,698 | 2/1987 | Bitonti . |
| 4,709,738 | 12/1987 | Goodell et al. . |
| 4,730,656 | 3/1988 | Goodell et al. . |
| 4,765,385 | 8/1988 | McGeachy . |
| 4,804,027 | 2/1989 | Runels . |
| 4,844,138 | 7/1989 | Kokubu . |
| 4,883,106 | 11/1989 | Schultz et al. . |
| 4,892,128 | 1/1990 | Bartos . |
| 4,932,451 | 6/1990 | Williams et al. . |
| 5,080,156 | 1/1992 | Bartos et al. . |
| 5,080,157 | 1/1992 | Oerter ..................................... 152/417 |
| 5,147,494 | 9/1992 | Torii et al. .............................. 277/563 |
| 5,429,167 | 7/1995 | Jensen . |
| 5,529,155 | 6/1996 | Jones et al. ............................. 277/563 |
| 5,605,337 | 2/1997 | Puri ......................................... 277/563 |
| 5,611,548 | 3/1997 | Dahlhaus ................................ 277/565 |
| 5,653,448 | 8/1997 | Schlosser ................................ 277/563 |
| 5,676,383 | 10/1997 | Chandler ................................. 277/565 |

FOREIGN PATENT DOCUMENTS

| | | | |
|---|---|---|---|
| 588595 | 3/1994 | European Pat. Off. ............... | 152/415 |
| 249210 | 2/1968 | U.S.S.R. ................................ | 152/417 |
| 2178705 | 2/1987 | United Kingdom ................... | 152/416 |

*Primary Examiner*—S. Joseph Morano
*Assistant Examiner*—Long Bao Nguyen
*Attorney, Agent, or Firm*—Foley & Lardner

[57] ABSTRACT

The present invention relates generally to work vehicles having a central tire inflation system provided to maintain proper tire inflation for the work vehicles. In particular, the invention relates to a seal arrangement for an inflatable wheel connected to a central tire inflation system, wherein the tire pressure may be controlled through a conduit attached to the tire valve, while the wheel remains rotatable with respect to the vehicle. The seal arrangement includes a seal carrier, an axle sleeve, and a set of seals. The seals create an air inlet and outlet path while retaining rotatability of the wheels.

21 Claims, 5 Drawing Sheets

SEAL ARRANGEMENT FOR A CENTRAL TIRE INFLATION SYSTEM

FIELD OF THE INVENTION

The present invention relates generally to the art of work vehicles having central tire inflation systems. More specifically, the present invention relates to the field of rotary seal arrangements for a wheel hub assembly.

BACKGROUND OF THE INVENTION

Work vehicles, including, but not limited to, agricultural work vehicles such as tractors and combines, as well as construction vehicles, such as loaders and backhoes, are often supported by a set of inflatable tires. The inflation pressure of these inflatable tires can be adjusted to provide a substantially cushioned ride while providing adequate traction support for the vehicle. Maintaining proper tire inflation provides better maneuverability and control of the work vehicle while minimizing the amount of vehicle slip, thereby increasing the amount of traction and power available for the vehicle. Further, maintaining proper tire inflation reduces the amount of fuel necessary during operation of the work vehicle and provides improved tire wear, thereby providing substantial cost savings. A number of factors and conditions exist which cause work vehicles to be operated despite having a non-optimal or improper tire inflation pressure. For example, tire inflation pressure is typically decreased gradually over time to a low-level by leaks and imperfect seals, and typically tire inflation pressure fluctuates as a function of temperature. In addition, the optimal tire inflation pressure will vary based upon the operating conditions of the work vehicle, such as the vehicle speed, the type of terrain, and the mission. In addition, the optimal tire inflation pressure depends upon the operating loads placed on the tires under various operating conditions, and possibly the slip of the vehicle tires.

It is well known that pneumatic tires are best operated at specific inflation pressures to optimize tire and vehicle performance for combinations of speed, load, terrain, and mission. Tire inflation pressure directly affects the tire shape, deflection, tire contact patch shape, tire contact patch area, resonant frequency, hysteresis, and other characteristics. Pneumatic tires are the power transmitting element and the whole or partial suspension in wheeled vehicles. Tire inflation pressures influence many vehicle parameters, including, but not limited to, load capacity, tractive ability, ride, handling, braking, stability, mobility, speed, rolling resistance, soft soil performance, and obstacle negotiation. It is advantageous to tailor the tire inflation pressure to match the vehicle operating environment and duty cycle. This is particularly true for on/off highway and off highway vehicles such as agricultural tractors and construction equipment operating over improved and unimproved terrain surfaces at multiple speeds and vehicle loads.

Well-known central tire inflation methods exist to generate, control, and distribute compressed air to vehicle tires. To enable these functions, all centrally supplied tire inflation systems require a means to deliver air from a source of pressurized air on the fixed chassis through a rotary seal to the rotating wheel and tire. Agricultural tractors and construction equipment are often equipped with a bar axle or like axle arrangement where the axle shaft extends from the axle housing supporting a hub that translates along the axle shaft length or is fixed to the distal end. The axle shaft is a primary load supporting and torque transmitting member. Bearings supporting the axle shaft are typically located in the axle housing fixed to the differential housing. Axles are equipped with single or multiple tire sets sometimes requiring a separate tire inflation pressure for an individual tire or tire set.

To operate a central tire inflation system, it is necessary to provide pressurized air to and from the inflatable wheels while the wheels are rotating. To maintain an air supply to and from the rotating inflatable wheels, the wheel assembly must include a seal arrangement that allows the wheel to rotate while keeping pressurized air within the inflatable wheels. The seal arrangement must allow for selectively inflating and deflating the wheel as the wheel rotates.

Well-known methods exist for delivering air or a vacuum to a rotating wheel through a rotary joint or seal located in a hub, or a planetary hub assembly. However, known methods do not include delivering compressed air or vacuum to a bar axle with adjustable track width or similar axle shaft arrangements with single and multiple tire sets.

One method for delivering air or a vacuum to a rotating wheel (as used in Rockwell, EATON, Oshkosh, and other axle applications) locates air passages in a fixed skein, spindle, or through or under a sleeve placed over the skein concentric to the wheel bearings, into air seals located between the wheel bearings in the rotating hub and through passages in the hub to fittings leading to the wheel and tire. This method, however, does not include transferring compressed air or a vacuum to a wheel where the wheel hub is not fixed along the axle shaft length or a wheel carrying hub where the wheel bearings are not included in the hub assembly.

Another method for delivering air or a vacuum to a rotating wheel (as used in AM General and other axle applications) conducts air through a passage formed inside a skein or non-rotating axle shaft, with the air passing through the solid shaft or skein to a rotary air fitting fitted at the distal end and connected through a conduit to the wheel valve. This method is useful for non-driving axles, particularly non-driving steering axles or non-center drive axles such as a portal axle.

Still another method for delivering air or a vacuum to a rotating wheel (as used in KMAZ and other axle applications) conducts air through a passage formed inside the drive shaft with a rotating seal located inside the axle housing. Compressed air passes through the rotary seal into the axle shaft to the rotating hub where passages or flexible conduits conduct air to the wheel assembly. This method requires a port passing through the drive shaft length, and does not provide for a hub that translates along the axle length.

Still another method for delivering air or a vacuum to a rotating wheel (as used in Possges and Tigges and other axle applications) delivers air to the rotating wheel entirely through a conduit passing outside the tire from the fixed vehicle chassis to a rotary seal mounted to the axle shaft distal end. A second conduit transfers air from the rotary seal to the wheel tire assembly along the axle shaft. This method is applicable to bar axles and the like, but requires a hose passing outside the vehicle and tire, the hose being subject to entanglement.

Still another method for delivering air or a vacuum to a rotating wheel (as used in Timken Bearing Corporation applications) employs a wheel bearing race containing ports or channels to pass air between the wheel bearings with air seals located outside the wheel bearing. The method does not include transferring compressed air or a vacuum to a wheel where the wheel hub is not fixed along the axle's length or a wheel carrying hub where the wheel bearings are not included in the hub assembly. The method also does not provide for oil bath lubrication.

Accordingly, it would be advantageous to provide a seal arrangement for a wheel hub that provides the ability to tailor tire inflation pressure to wheel load, vehicle speed, mission, terrain, and other parameters while stationary or underway.

Further, it would be advantageous to provide a seal arrangement that provides for the delivery of air to a wheel mounted to a bar axle or like arrangement that is easily retrofittable with little or no modification.

Still further, it would be advantageous to provide an apparatus for transmitting air to a wheel assembly mounted to a bar axle or like axle that does not interfere with the ability to change the vehicle track width.

Still further, it would be advantageous to provide a seal arrangement for transmitting air to a wheel assembly mounted to a bar axle or like axle that uses a conventional wheel and tire.

Still further, it would be advantageous to provide an apparatus for transmitting air to a wheel assembly mounted to a bar axle or like axle that optionally permits independently controlled inflation pressure to individual tires or tire sets.

Still further, it would be advantageous to provide an apparatus for transmitting air to a wheel assembly mounted to a bar axle or like axle that is installed as a separate unit fixed to the axle housing.

SUMMARY OF THE INVENTION

The present invention relates to a mechanism for delivering air to a wheel valve of a vehicle. The vehicle includes at least one inflatable wheel pneumatically coupled to the wheel valve, a rotatable axle with the at least one inflatable wheel attached thereon, and a frame at least partially supported by the at least one inflatable wheel and the rotatable axle. The vehicle also includes a central tire inflation system. The mechanism includes a seal carrier interconnected with the vehicle frame, the seal carrier having a seal carrier air port configured to communicate air with the central tire inflation system. The vehicle further includes a rotatable sleeve coupled to the rotatable axle, the sleeve having an aperture, a sleeve air port, and a sleeve air passage running between the aperture and the sleeve air port. The sleeve air port is configured to communicate air with the wheel valve. The vehicle still further includes a seal assembly, the seal assembly creating a seal assembly air passage between the seal carrier and the sleeve and interconnecting the seal carrier air port and the aperture in the sleeve.

The present invention further relates to a wheel assembly for a vehicle. The vehicle includes a central tire inflation system. The wheel assembly includes an axle housing mounted to the vehicle, a bar axle supported for rotation within the axle housing, at least one inflatable wheel mounted on the bar axle, a wheel valve pneumatically coupled to the wheel, and a seal carrier fixed to the axle housing, the seal carrier having a seal carrier air port configured to communicate air with the C.T.I.S., a rotatable sleeve having a circumference coupled to the bar axle, the sleeve having an aperture in the circumference, a sleeve air port and a sleeve air passage running between the aperture and the sleeve air port, wherein the sleeve air port is configured to communicate air with the wheel valve, and a seal assembly. The seal assembly creates a seal assembly air passage between the seal carrier and the sleeve and interconnecting the seal carrier air port and the aperture in the sleeve.

The present invention still further relates to a work vehicle having a frame, a propulsion system, at least one bar axle rotatably mounted to the frame by a bearing system and at least one inflatable wheel mounted to the at least one axle and having an air valve. The vehicle includes a central tire inflation system. The vehicle also includes a seal carrier fixed to the bearing system, the seal carrier has a seal carrier air port connected to the central tire inflation system. The vehicle also includes a rotatable sleeve coupled to the at least one axle. The sleeve has a sleeve air port connected to the air valve of the inflatable wheel, an aperture in a circumference of the sleeve, and a sleeve air passage running between the sleeve air port and the aperture. The vehicle also includes a seal assembly, the seal assembly creating a seal assembly air passage between the seal carrier and the sleeve and interconnecting the seal carrier air port and the aperture in the sleeve.

The present invention still further relates to a mechanism for delivering air from a vehicle mounted air source to a wheel valve located on an inflatable wheel, the wheel being mounted to the vehicle having the vehicle mounted air source, the vehicle has at least one axle with the inflatable wheel mounted thereto, the mechanism includes a substantially stationary carrier, mounted to the vehicle, an axle sleeve substantially fixed to the vehicle axle and rotatable therewith, at least one outlet port connected to the at least one air passage, and at least one air seal. The air seal creates a seal between the stationary carrier and the axle sleeve wherein the at least one air seal prevents air from substantially escaping the air pathway created between the inlet port and the outlet port. The substantially stationary carrier includes an air inlet port and at least one air passage connected to the air inlet port. The axle sleeve includes at least one air passage interconnected with the at least one air passage of the stationary carrier.

The present invention still further relates to a work vehicle including a frame, at least two inflatable wheels mounted on at least one axle, the at least one axle being interconnected with the work vehicle, a propulsion system, and an air supply mounted on the work vehicle. The work vehicle includes at least two substantially stationary carriers, mounted to the work vehicle, the stationary carriers each including an air inlet port and at least one air passage connected to the air inlet port. The work vehicle also includes at least two axle sleeves substantially fixed to the at least one vehicle axle and rotatable therewith, the axle sleeves each including at least one air passage interconnected with the at least one air passage of the stationary carrier, and at least one outlet port connected to the at least one air passage. The work vehicle still further includes at least one air seal corresponding to each stationary carrier, the seal creating a seal between the stationary carrier and the axle sleeve wherein the at least one air seal prevents air from substantially escaping the air pathway created between the inlet port and the outlet port.

BRIEF DESCRIPTION OF THE DRAWINGS

The invention will hereafter be described with reference to the accompanying drawings, wherein like reference numerals denote like elements in the various drawings, and.

DETAILED DESCRIPTION OF THE PREFERRED EMBODIMENTS

Figure 1:
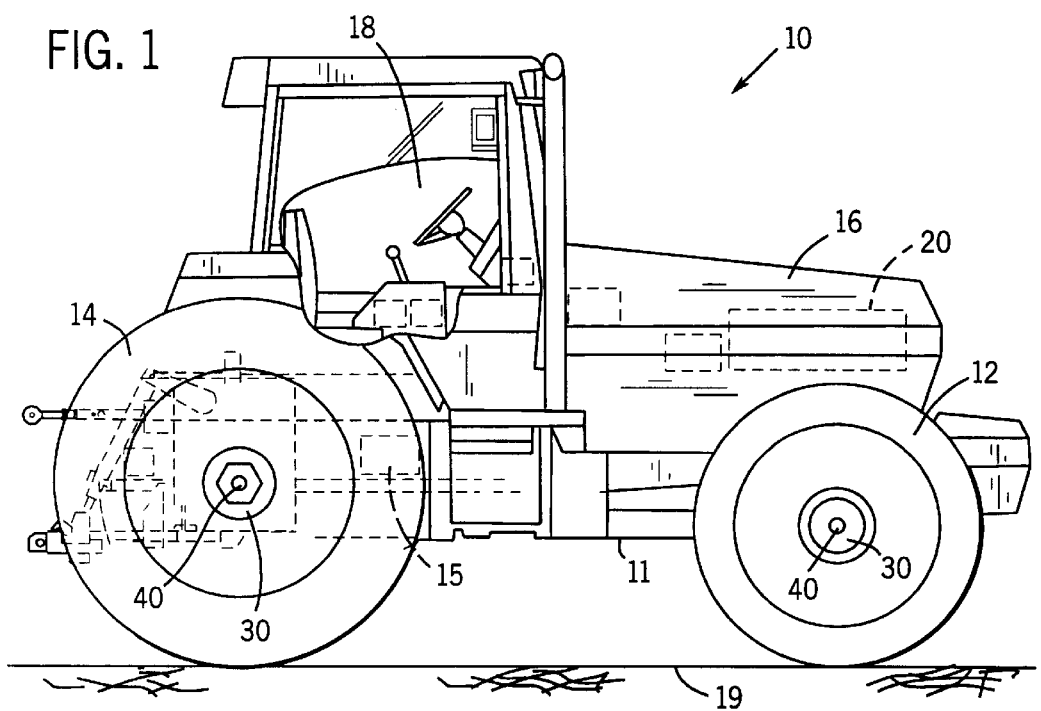
FIG. 1 is an elevation view of a tractor having a set of inflatable wheels.

Referring to FIG. 1, a tractor 10 is shown. Tractor 10 includes a frame 11, front inflatable wheels 12, rear inflatable wheels 14, an engine compartment 16, an operator cab 18, and an engine 20. Tractor 10 is propelled along ground 19 by inflatable wheels 12 and 14, which receive power from engine 20 via a transmission (not shown).

In a preferred embodiment, the tractor depicted in FIG. 1 has a central tire inflation system 15 including a source of pressurized air pneumatically coupled to front inflatable wheels 12 and rear inflatable wheels 14. Having central tire inflation system 15 requires one or more rotary seal arrangements that are capable of delivering pressurized air to and from inflatable wheels 12 and inflatable wheels 14 while the wheels are rotating or are at rest.

Figure 2:
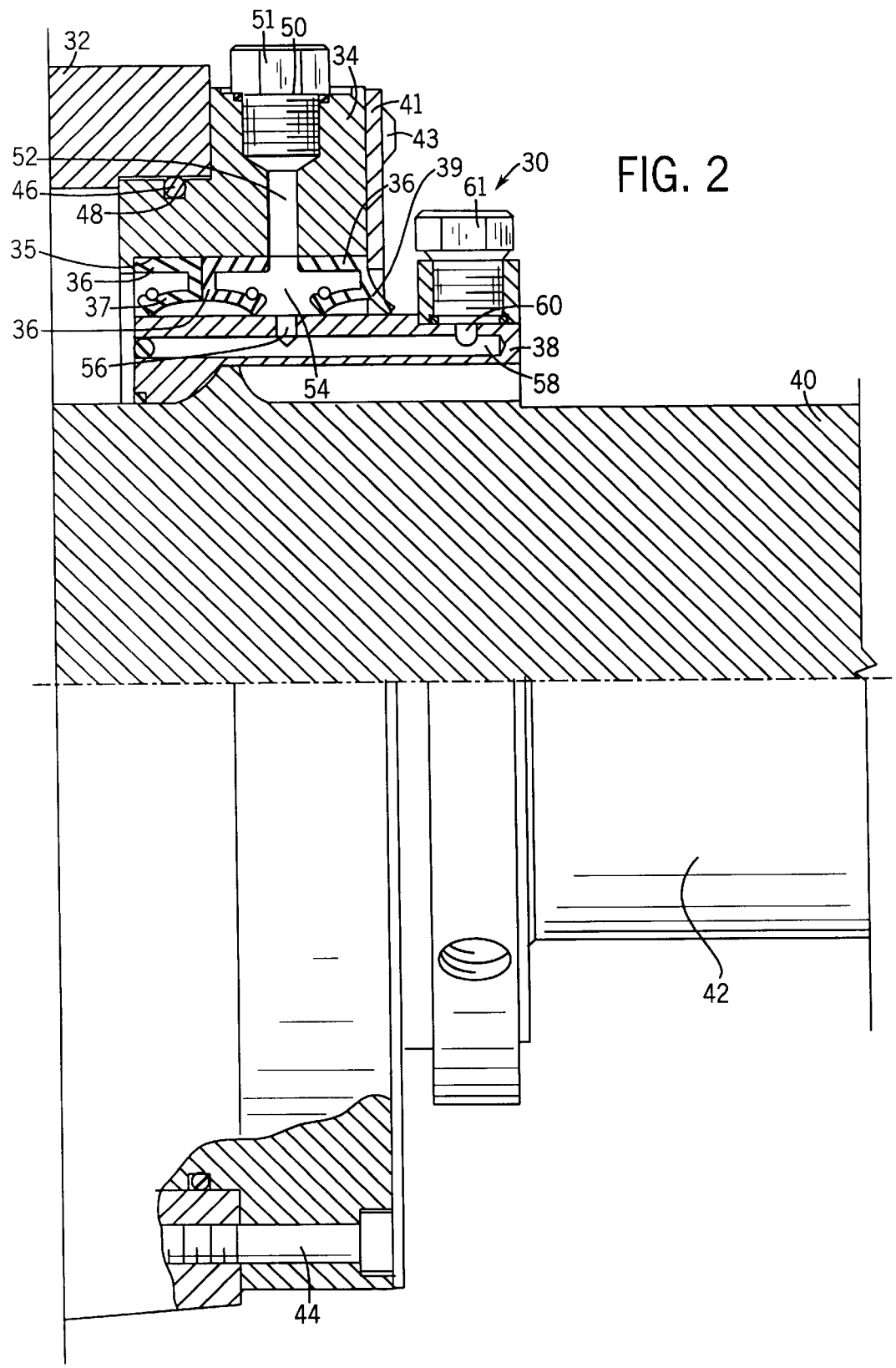
FIG. 2 is a partial cross-sectional view of a wheel hub assembly having a rotary seal arrangement.

A preferred embodiment of a rotary seal arrangement 30 is depicted in FIG. 2. In this embodiment, there is a separate seal arrangement 30 coupled to each of the wheels 12 and 14. However, there can be fewer seal arrangements 30 coupled to fewer than all the wheels (e.g., coupled to front wheels 12 only, or coupled to rear wheels 14 only). Each seal arrangement 30 includes a vehicle axle housing 32, a seal carrier 34, a seal set 36, and a sleeve 38.

Vehicle axle housing 32 is mounted on vehicle 10. Vehicle axle housing 32 preferably includes a bearing set (not shown) that allows an axle 40 to rotate with respect to vehicle 10. Axle 40 transfers the weight of vehicle 10 from axle housing 32 to inflatable wheels 12 and 14. An inflatable wheel can be mounted on axle shaft surface 42 and fixed thereto. Seal carrier 34 is fixed to axle housing 32 by one or more fasteners such as bolt 44 depicted in FIG. 2. Therefore, seal carrier 34 is substantially restrained from moving with respect to axle housing 32, while axle 40 is free to rotate within axle housing 32.

An O-ring seal 46 positioned in a groove 48 formed in seal carrier 34 to keep dirt and debris from entering axle housing 32. Seal carrier 34 further has an air port 50 to which an air port fitting 51 and an air conduit (not shown) can be attached. An air conduit attached at one end to air port fitting 51 would be attached to central tire inflation system 15 at the other end. Therefore, air can flow through air port 50 in either direction to selectively inflate or deflate the wheel 12 or 14. When pressurized air flows into air port 50, it flows through an air passage 52 and into a seal cavity 54. Seal cavity 54 is created by seal set 36 and sleeve 38. Sleeve 38 has an aperture 56 extending between its outer wall and an inner air passage 58. Air passage 58 extends between aperture 56 and an air port fitting 61. An air conduit (not shown) can be fixed to air port fitting 61 and extend to the wheel valve (not shown) of an inflatable wheel 12 or 14 mounted to surface 42 of axle 40. Thus, air can pass in either direction between CTIS 15, seal carrier 34, sleeve 38, the wheel valve, and the wheel 12 or 14. Further, seal set 36 is designed to hold either pressurized air in the air flow path and alternatively, seal set 36 is designed to contain a vacuum in the air flow path. "Seal set 36 also includes a debris seal or debris excluder 39 (alternatively, the debris excluder may include a labyrinth that is inherently difficult for dirt to traverse). The debris excluder 39 keeps debris or dirt from entering the region of seal set 36 thereby helping to maintain a substantial hermetic seal of air cavity 54. Debris excluder 39 is in part held in place by face clamp 41 that is held in place by one or more face clamp retainer screws 43".

In operation, axle 40 rotates with respect to axle housing 32. Sleeve 38 is affixed to axle 40 and rotates therewith. Sleeve 38 can be affixed to axle 40 by any conventional method including, but not limited to, bolt fasteners, clamp rings, or other fasteners. Air to be delivered to mounted wheel 12 or 14 comes through air port 50 from central tire inflation system 15 via passage 52 into seal cavity 54, through aperture 56 into air passage 58, and out through air port 60. The air then flows through a conduit (not shown) attached on one end to fitting 61 and on the other end to the air valve on inflatable wheel 12 or inflatable wheel 14.

Figure 5:
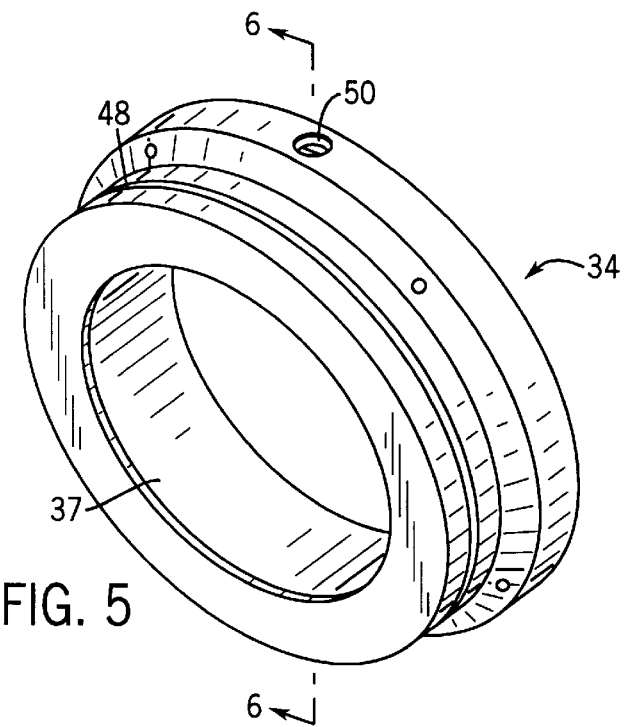
FIG. 5 is a perspective view of the seal carrier of FIGS. 2 and 3.
Figure 6:
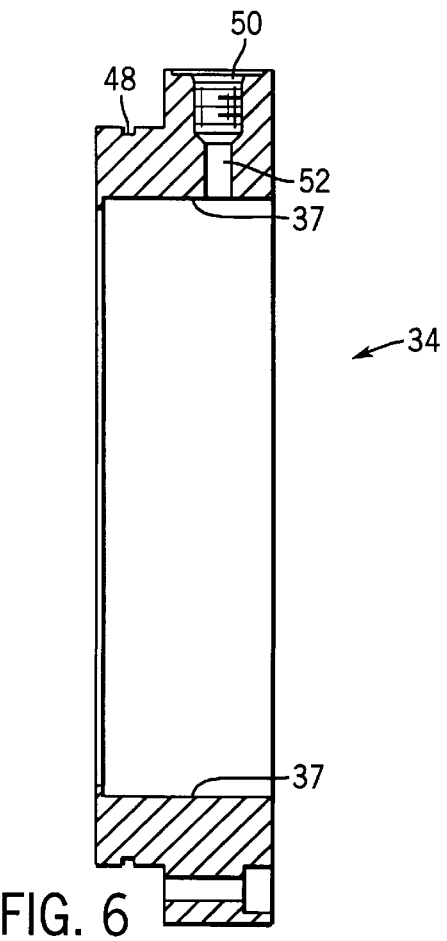
FIG. 6 is a cross-sectional view of the seal carrier of FIG. 5 taken across line 6—6.
Figure 7:
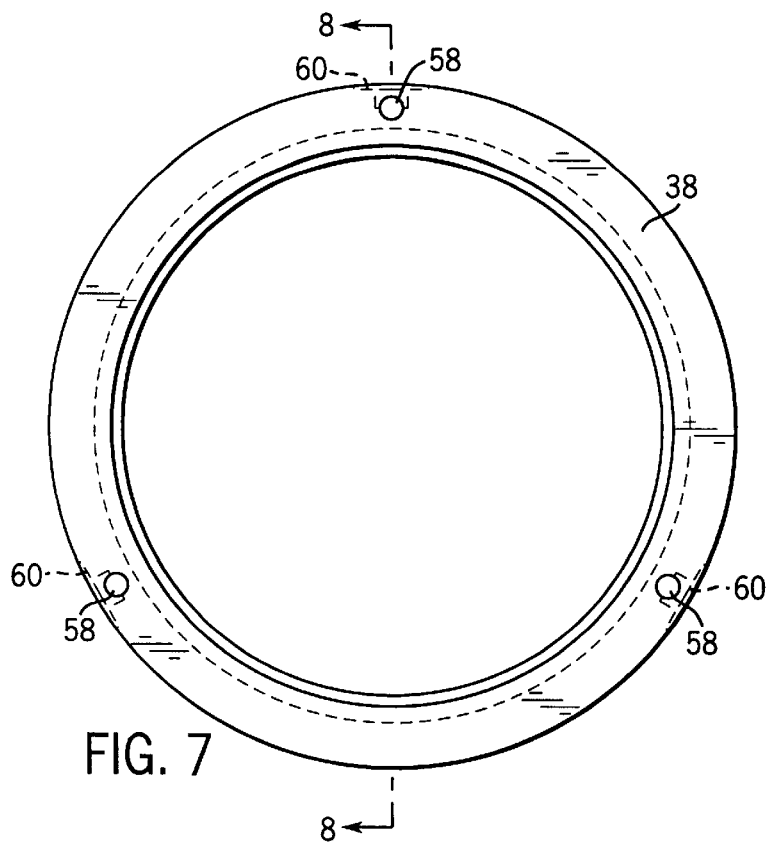
FIG. 7 is an elevation view of the sleeve depicted in FIG. 2.
Figure 8:
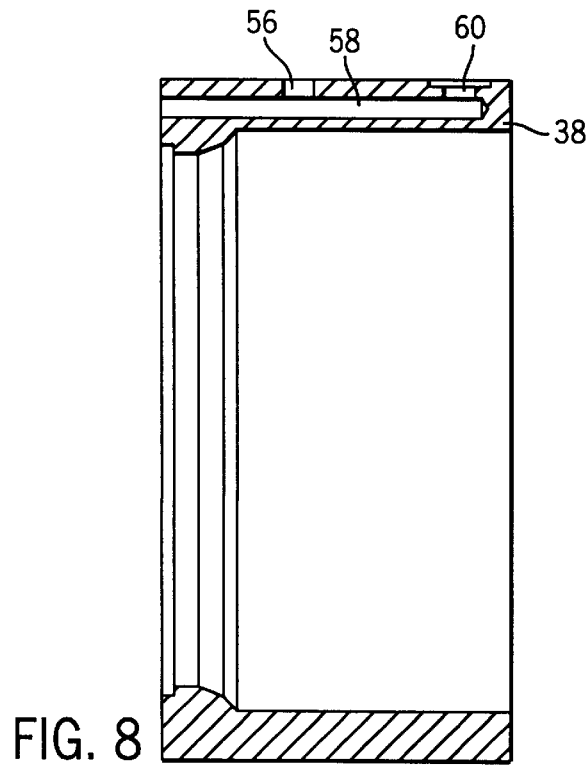
FIG. 8 is a cross-sectional view of the sleeve of FIG. 7 taken across line 8—8.

Seal set 36 is preferably attached to a surface 35 of seal carrier 34, depicted in FIGS. 2, 5 and 6. Therefore, during rotation of axle 40, seal set 36 remains substantially fixed with respect to axle housing 32. As depicted in FIGS. 7 and 8, sleeve 38 can have multiple air passages 58 and multiple air ports 60. Each air port 60 may have an air port fitting 61 attached thereto, as shown in FIG. 2. Each of air passages 58 extends from an aperture 56 to air ports 60. Alternatively, seal set 36 can be affixed to sleeve 38 instead of seal carrier 34.

To facilitate the rotation of axle 40 with sleeve 38 mounted thereto, seal set 36 includes a lubricant seal 37 as depicted in FIG. 2. Lubricant seal 37 lubricates the seal interface between seal set 36 and sleeve 38. Additionally, any lubricants applied to lubricant seal 37 aid in maintaining the sealed air cavity 54.

Figure 3:
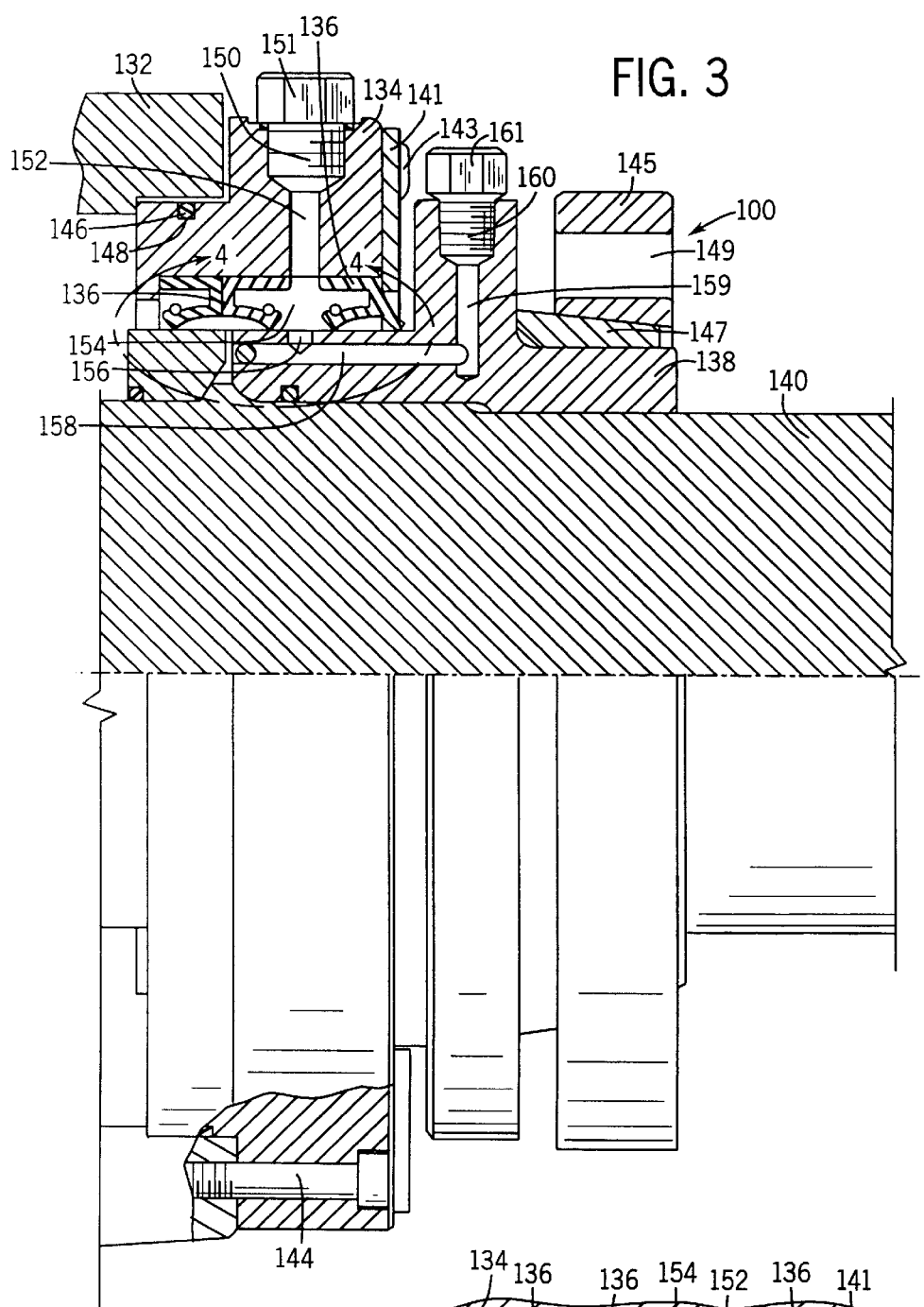
FIG. 3 is a partial cross-sectional view of an alternative embodiment of a wheel hub assembly having a rotary seal arrangement and a clamp ring.

A number of alternative mechanical arrangements are possible, all falling within the scope and spirit of the present invention. For example,° FIG. 3 depicts an alternative seal arrangement 100. Seal arrangement 100 includes an axle housing 132, a seal carrier 134, a seal set 136, a sleeve 138, an axle 140, and a clamp ring 145. Similar to FIG. 2, axle housing 132 is fixed to vehicle 10 and seal carrier 134 is fixed to axle housing 132 by a bolt 144. Further, an O-ring seal 146 carried within a groove 148 formed in seal carrier 134 prevents debris from entering axle housing 132. Seal carrier 134 further has an air port 150 fitted with an air port fitting 151 to which a conduit can be attached and routed to a central tire inflation system, such as central tire inflation system 15 depicted in FIG. 1. Air flowing through air port 150 enters a passage 152 and into an air cavity 154 created by seal set 136. Similar to the embodiment shown in FIG. 2, sleeve 138 has an aperture 156 connecting air cavity 154 to an air passage 158 in sleeve 138. Air entering air passage 158 is delivered to a second air passage 159, air passage 159 being connected to an air port 160 having an air port valve fitting 161. A conduit can be connected to air valve fitting 161 on a first end and connected to a wheel air valve (not shown) on a second end.

Figure 4:
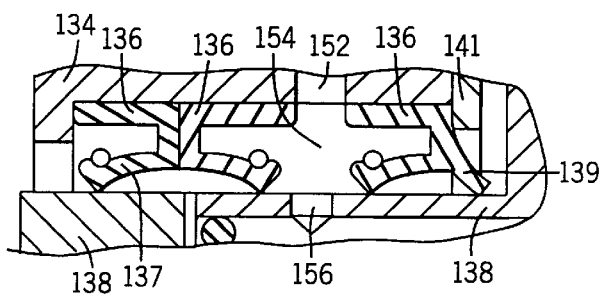
FIG. 4 is a close-up cross-sectional view of the seal set depicted in FIG. 3.

To facilitate the rotation of axle 140 with sleeve 138 mounted thereto, seal set 136 includes a lubricant seal 137 as depicted in FIG. 4. Lubricant seal 137 lubricates the seal interface between seal set 136 and sleeve 138. Additionally, any lubricants applied to lubricant seal 137 aid in maintaining the sealed air cavity 154. Seal set 136 also includes a debris seal or debris excluder 139 (Alternatively, the debris excluder may include a labyrinth that is inherently difficult for dirt to traverse). Debris excluder 139 keeps debris or dirt from entering the region of seal set 136 thereby helping to maintain a substantially hermetic seal of air cavity 154. Debris excluder 139 is in part held in place by face clamp ring 141 that is held in place by one or more face clamp retainer screws 143. Seal assembly 136 may preferably include seals such as those manufactured by Freundenberg NOK Corporation.

Unlike the embodiment depicted in FIG. 2, sleeve 138 is substantially fixed to axle 140 by clamp ring 145 and a lock ring 147. Clamp ring 145 and lock ring 147 work together to keep sleeve 138 substantially fixed to axle 140 by using a contractive interference fit. Further, aperture 149 in clamp ring 145 can be used to mount inflatable wheels 12 or 14 onto axle 140. Clamp ring 145 and locking ring 147 are preferably shrink disks manufactured by Ringfeder Corporation.

Although only a few exemplary embodiments of this invention have been described above, those skilled in the art will readily appreciate that many modifications are possible in the exemplary embodiments without materially departing from the novel teachings and advantages of this invention. As is readily indicated, the invention can be employed in a variety of ways and using a variety of mechanical configurations. Further, the type of work vehicle may be varied in so far as it has a need for a rotary seal arrangement. Other modifications may include the attachment arrangements attaching the seal carrier to the axle housing and attaching the sleeve to the axle. Accordingly, all such modifications are intended to be included within the scope of the invention as defined in the following claims. Other substitutions, modifications, changes, and omissions may be made in the design, operating conditions, and arrangement of preferred alternative embodiments without departing from the spirit of the invention as expressed in the following claims.

What is claimed is:

1. A mechanism for delivering air to a wheel valve of a vehicle, the vehicle including at least one inflatable wheel pneumatically coupled to the wheel valve, a rotatable axle having the at least one inflatable wheel attached thereon, and a frame at least partially supported by the at least one inflatable wheel and the rotatable axle, the vehicle also including a central tire inflation system, the mechanism comprising:

a seal carrier interconnected with the vehicle frame, the seal carrier having a seal carrier air port configured to communicate air with the central tire inflation system;

a rotatable sleeve coupled to the rotatable axle, the sleeve having an aperture, a sleeve air port, and a sleeve air passage running between the aperture and the sleeve air port, wherein the sleeve air port is configured to communicate air with the wheel valve; and a seal assembly, the seal assembly creating a seal assembly air passage between the seal carrier and the sleeve and interconnecting the seal carrier air port and the aperture in the sleeve.

2. The mechanism of claim 1, wherein the seal assembly is connected to the sleeve.

3. The mechanism of claim 1, wherein the seal assembly is connected to the seal carrier.

4. The mechanism of claim 3, wherein the sleeve is substantially fixed to the rotatable axle with a clamp ring.

5. The mechanism of claim 3, wherein the sleeve has more than one aperture, more than one sleeve air port, and more than one sleeve air passage, each of the sleeve air passages running between one of the apertures and one of the sleeve air ports.

6. The mechanism of claim 3, wherein the seal assembly further includes at least one lubricant seal.

7. The mechanism of claim 5, wherein the seal assembly includes a debris seal.

8. A wheel assembly for a vehicle including a central tire inflation system, the wheel assembly comprising:

an axle housing mounted to the vehicle;

a bar axle supported for rotation within the axle housing;

at least one inflatable wheel mounted on the bar axle;

a wheel valve pneumatically coupled to the wheel;

a seal carrier fixed to the axle housing, the seal carrier having a seal carrier air port configured to communicate air with the C.T.I.S.;

a rotatable sleeve having a circumference coupled to the bar axle, the sleeve having an aperture in the circumference, a sleeve air port and a sleeve air passage running between the aperture and the sleeve air port, wherein the sleeve air port is configured to communicate air with the wheel valve; and a seal assembly, the seal assembly creating a seal assembly air passage between the seal carrier and the sleeve and interconnecting the seal carrier air port and the aperture in the sleeve.

9. The wheel assembly of claim 8, wherein the seal assembly is connected to the sleeve.

10. The wheel assembly of claim 8, wherein the seal assembly is connected to the seal carrier.

11. The wheel assembly of claim 10, wherein the sleeve is substantially fixed to the bar axle with a clamp ring.

12. The wheel assembly of claim 10, wherein the sleeve has more than one aperture, more than one sleeve air port and more than one sleeve air passage, each of the sleeve air passages running between one of the apertures and one of the sleeve air ports.

13. The wheel assembly of claim 10, wherein the seal assembly includes at least one lubricant seal.

14. The wheel assembly of claim 13, wherein the seal assembly includes a debris seal.

15. A work vehicle having a frame, a propulsion system, at least one bar axle rotatably mounted to the frame by a bearing system and at least one inflatable wheel mounted to the at least one axle and having an air valve, the vehicle comprising:

a central tire inflation system;

a seal carrier fixed to the bearing system, the seal carrier having a seal carrier air port connected to the central tire inflation system;

a rotatable sleeve coupled to the at least one axle, the sleeve having a sleeve air port connected to the air valve of the inflatable wheel, an aperture in a circumference of the sleeve, and a sleeve air passage running between the sleeve air port and the aperture; and a seal assembly, the seal assembly creating a seal assembly air passage between the seal carrier and the sleeve and interconnecting the seal carrier air port and the aperture in the sleeve.

16. The work vehicle of claim 15, wherein the seal assembly is connected to the sleeve.

17. The work vehicle of claim 15, wherein the seal assembly is connected to the seal carrier.

18. The work vehicle of claim 17, wherein the sleeve is substantially fixed to the bar axle with a clamp ring.

19. The work vehicle of claim 17, wherein the sleeve has more than one aperture, more than one sleeve air port and more than one sleeve air passage, each of the sleeve air passages running between one of the apertures and one of the sleeve air ports.

20. The work vehicle of claim 17, wherein the seal assembly includes at least one lubricant seal.

21. The work vehicle of claim 19, wherein the seal assembly includes a debris seal.

\* \* \* \* \*